INVENTORS
ROBERT W. LARSON
JOHN P. LUNDBERG

Dugger, Peterson, Johnson & Westman
ATTORNEYS

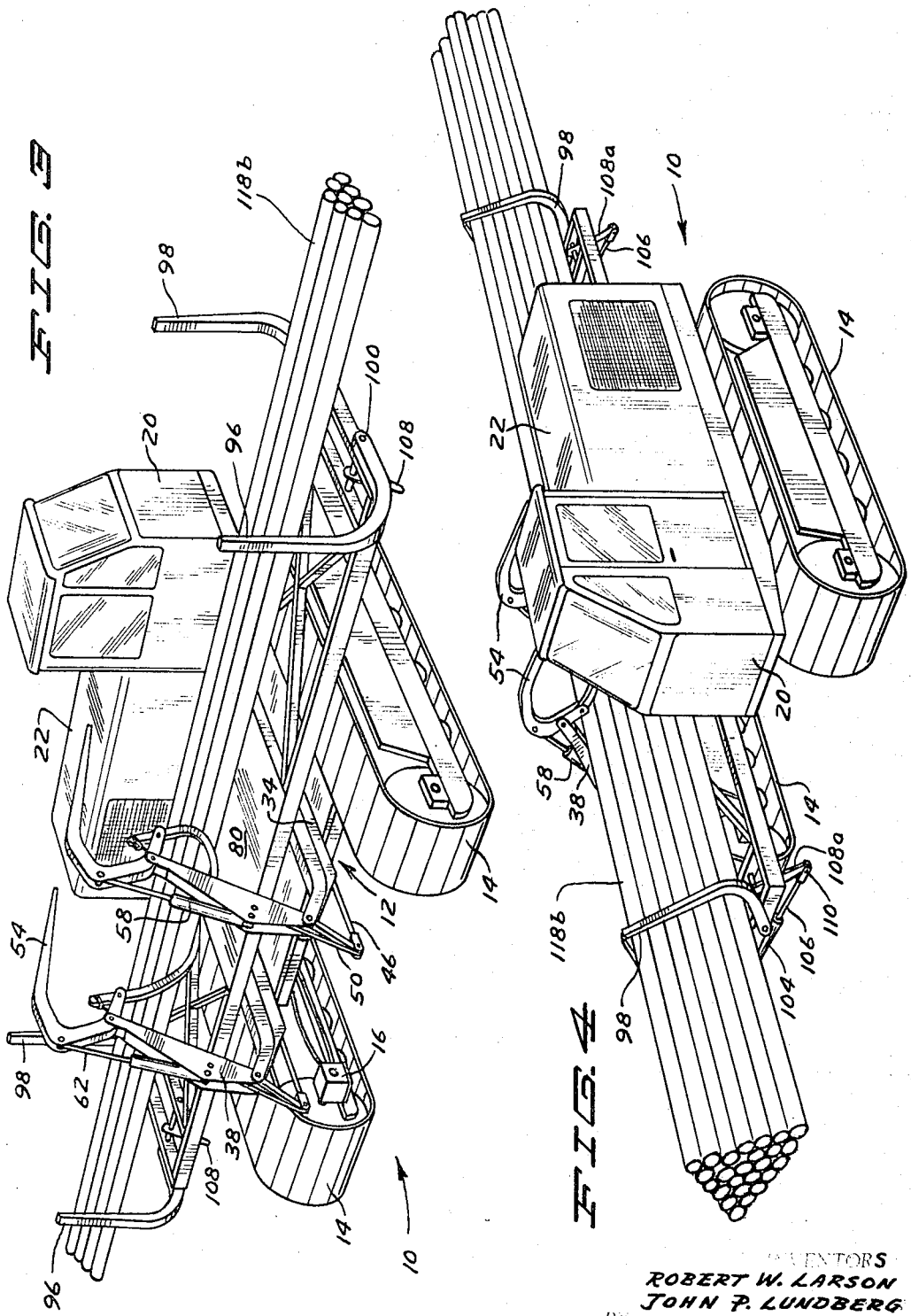

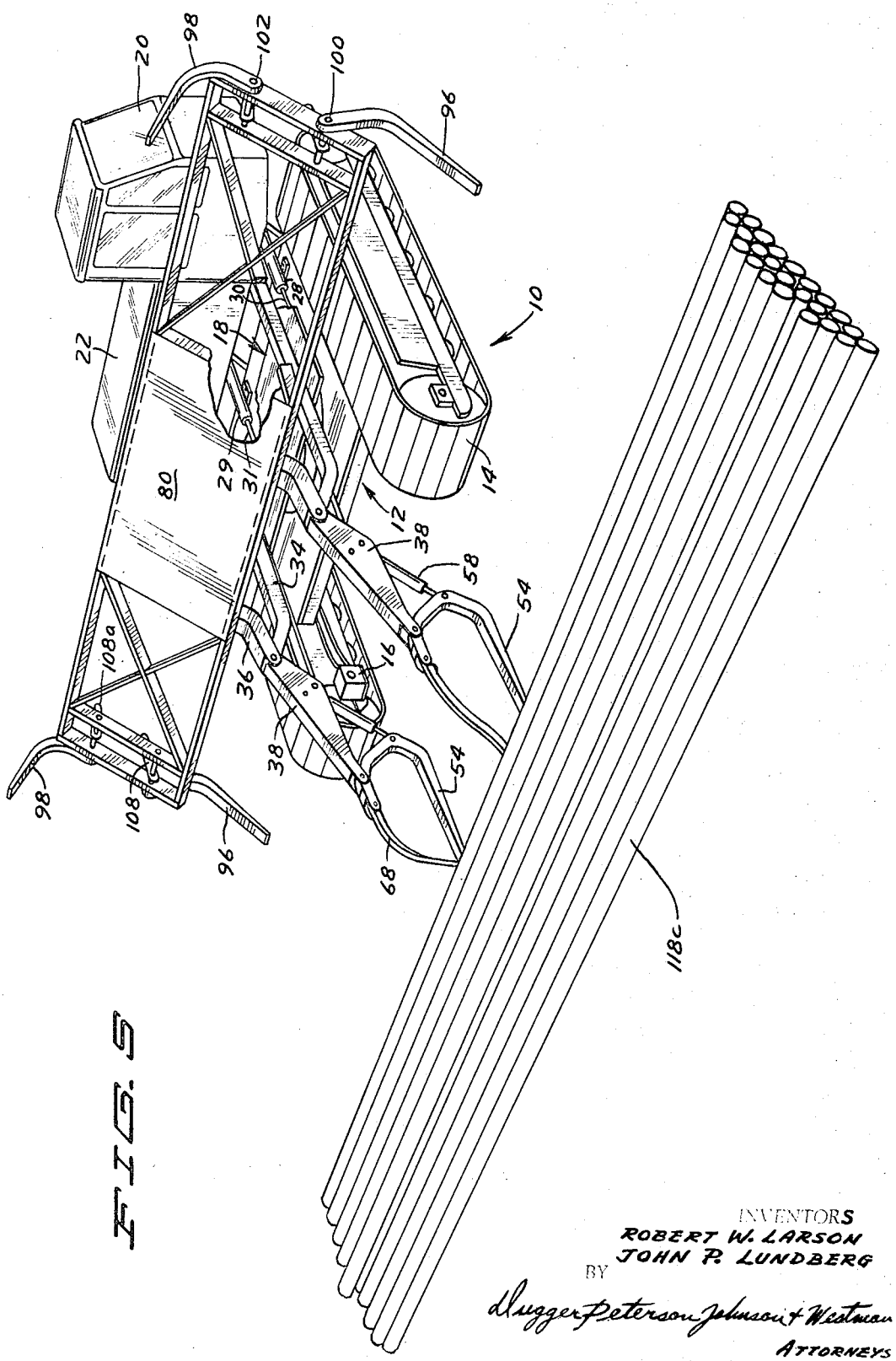

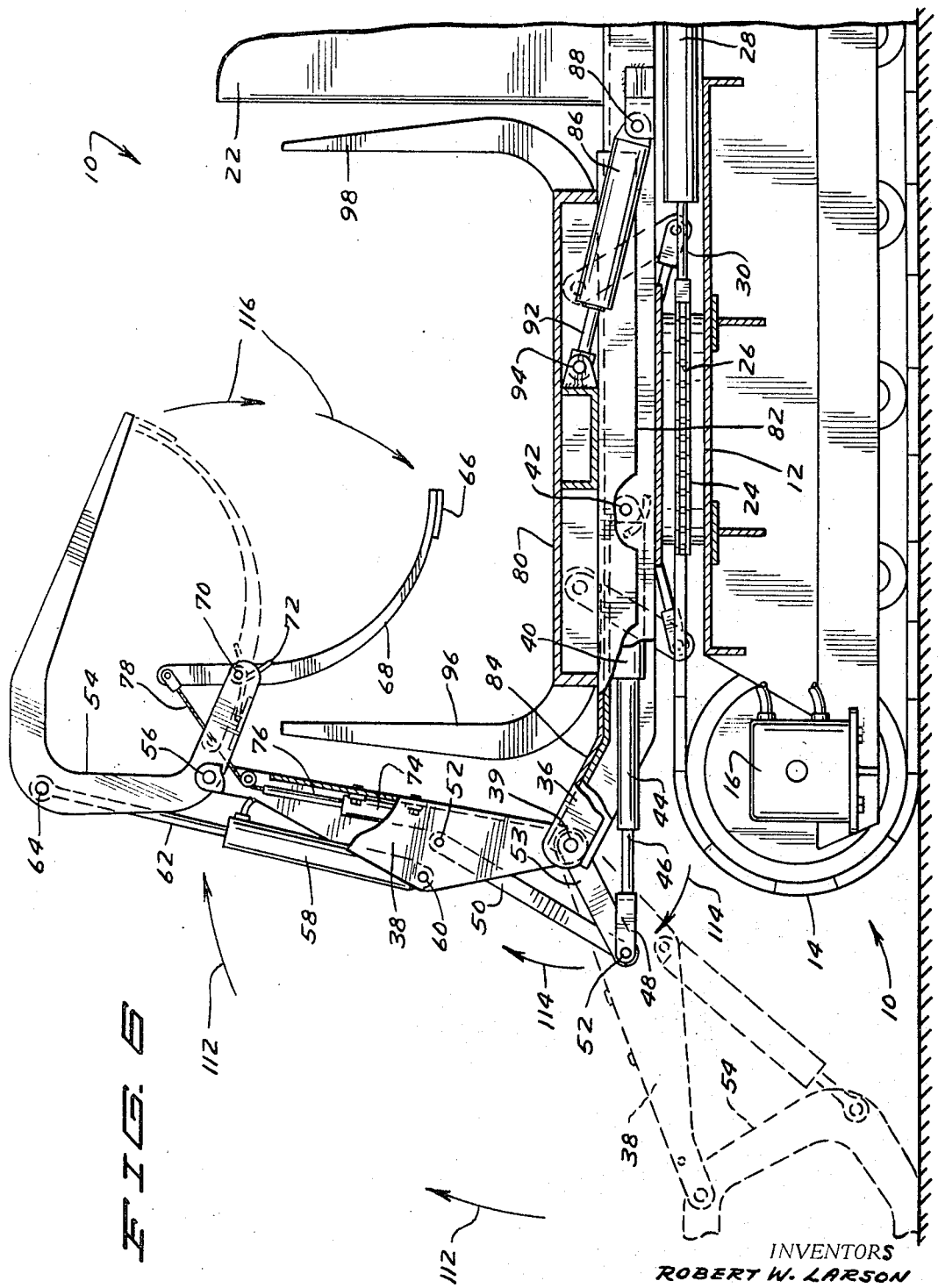

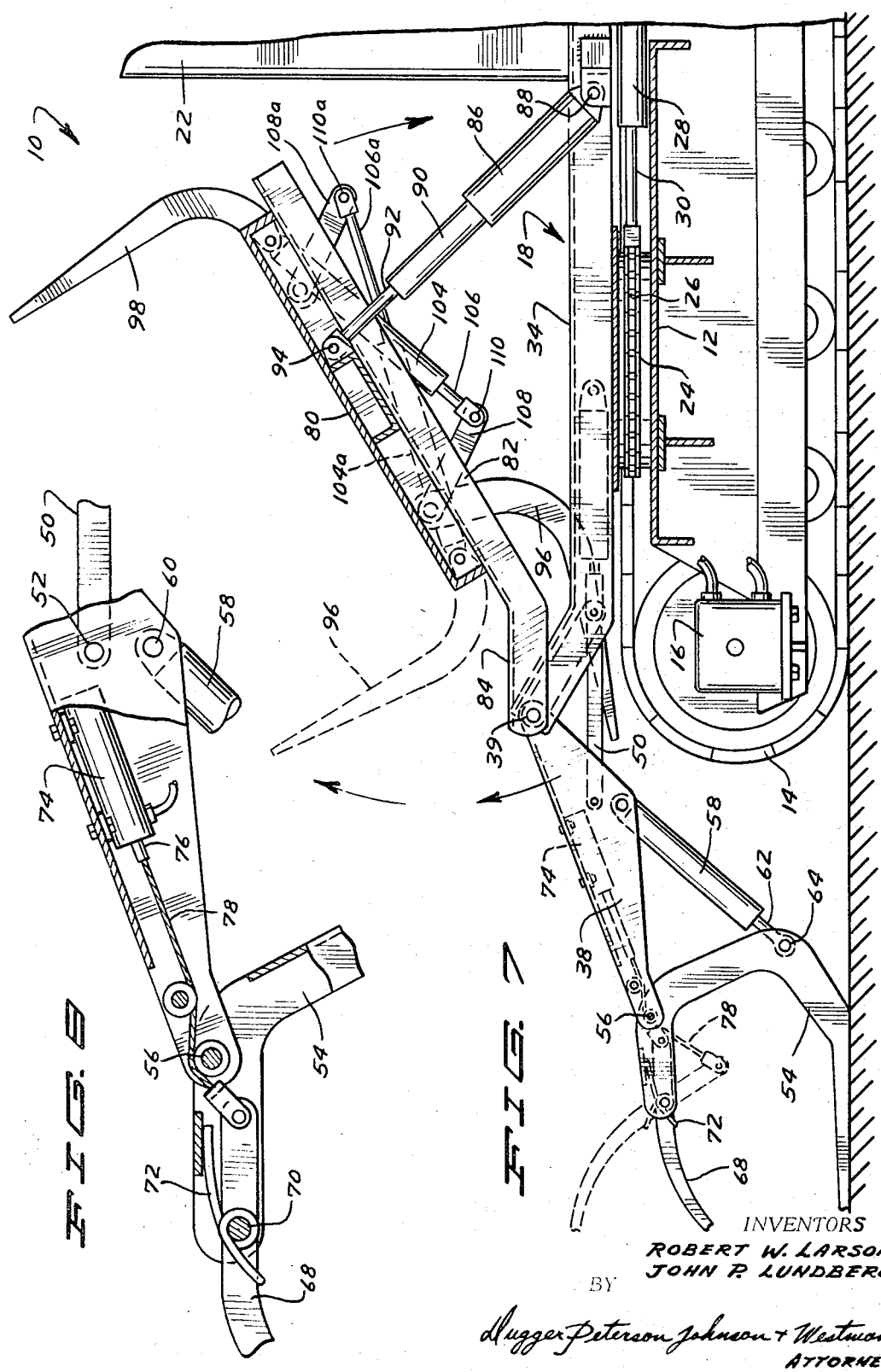

United States Patent Office 3,452,887
Patented July 1, 1969

3,452,887
APPARATUS FOR LOADING AND TRANSPORTING
TREE-LENGTH LOGS
Robert W. Larson and John P. Lundberg, Port Arthur,
Ontario, Canada, assignors to Beloit Corporation,
Beloit, Wis., a corporation of Wisconsin
Filed Aug. 4, 1967, Ser. No. 658,371
Int. Cl. B60p 1/48
U.S. Cl. 214—80                                    8 Claims

ABSTRACT OF THE DISCLOSURE

Mobile apparatus can approach a pile of tree-length logs laying on the ground from one side of the pile. By means of a pair of lift forks, the logs are elevated onto a platform which is mounted on the apparatus. The platform is swingable through 90° after the logs have been deposited thereon and in this way the logs can be transported by the apparatus to a desired vantage point. The platform is then swung back to its original position in which the logs were loaded thereon, and while in this position tilted about a horizontal axis so as to gravitationally discharge the logs.

Cross-reference to related application

Apparatus for lifting tree-length logs and shifting them while being held to an optimum position is described and claimed in a co-pending application for "Apparatus for Lifting and Forwarding Tree-Length Logs," Ser. No. 658,372, filed on even date herewith, in the names of Robert W. Larson and Joseph C. Jam, and assigned to the same assignee as this application.

Background of the invention

The present invention relates to apparatus that is self-loading and which thereafter can be efficiently utilized for hauling logs out of a wooded region. As described in U.S. Patent No. 3,252,487, issued on May 24, 1966, for "Apparatus for Delimbing and Felling Trees," trees of substantial height are delimbed while standing and then are felled. When it is recognized that such logs may have a length on the order of from 75 to 85 feet, a problem arises with respect to the handling of the logs. It is customary to employ a grapple for lifting the logs onto a truck or trailer in order that they can be moved out of the wooded region. However, this necessitates a considerable amount of equipment and also requires an additional operator for the grappling equipment.

A feature of the present invention is that a single vehicle can be utilized for lifting the logs and also hauling the logs to a particular location, such as where a slasher is located or where the logs are to be reloaded for further transporting.

Summary of the invention

Briefly, a vehicle such as a tractor with endless tracks, has mounted thereon a frame structure that can be swung through at least 90° (usually 360°) about a substantially vertical axis. Through the agency of a platform movable in unison with the frame structure, any logs that are placed on the platform when in a first or transverse position can be moved through the foregoing right angle into a second or longitudinal position with respect to the direction the vehicle is designed to travel. Thus, by reason of a fork lift projecting from the frame structure, a pile of logs can be elevated and then allowed to fall onto the platform when the platform is in its transverse position. The rotation of the platform through the 90° angle into the second or longitudinal position then makes it much more convenient to transport the tree-length logs to another location for further processing. The platform, after being swung back to its first or transverse position, it tiltable with respect to the frame structure about a horizontal axis so that the logs will roll gravitationally from the platform when at the desired destination.

Brief description of the drawings

FIGURE 3 shows the completion of the loading step for the first group of tree-length logs;

FIGURE 4 is a perspective view of a full load after the tree-length logs have been swung through 90° in order to facilitate the transportation thereof;

FIGURE 5 is a perspective view with the platform rotated back to its initial position but tilted so as to effect the gravitational discharge of the logs carried thereon during the transportation step;

FIGURE 6 is a side elevational view corresponding generally to FIGURE 3, but having the initial position of the fork lift superimposed in phantom outline so as to illustrate more clearly the path taken by the logs during the loading step;

FIGURE 7 is a side elevational view corresponding generally to FIGURE 5 but illustrating in greater detail the mechanism by which the platform is tilted, and FIGURE 8 is a fragmentary view of the cable and its operating cylinder via which a clamping action can be applied to the logs.

Description of the preferred embodiment

Figure 1:
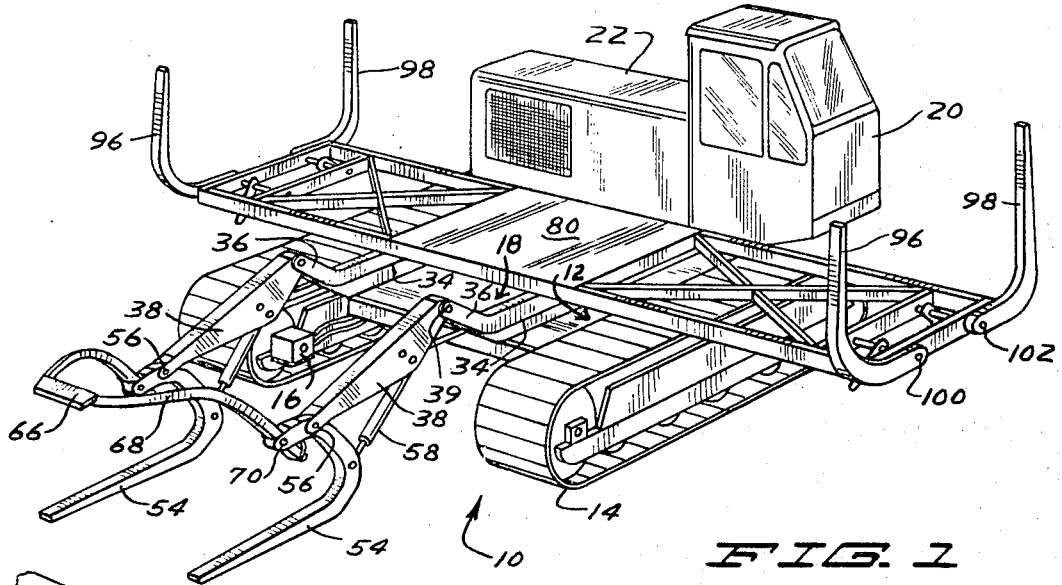
FIGURE 1 is a perspective view showing our apparatus approaching a pile of tree-length logs in preparation for a loading operation.
Figure 2:
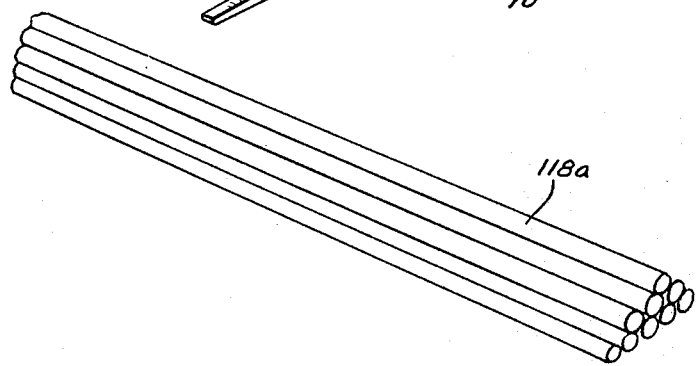
FIGURE 2 is a perspective view showing the actual loading step in progress.
Figure 2:
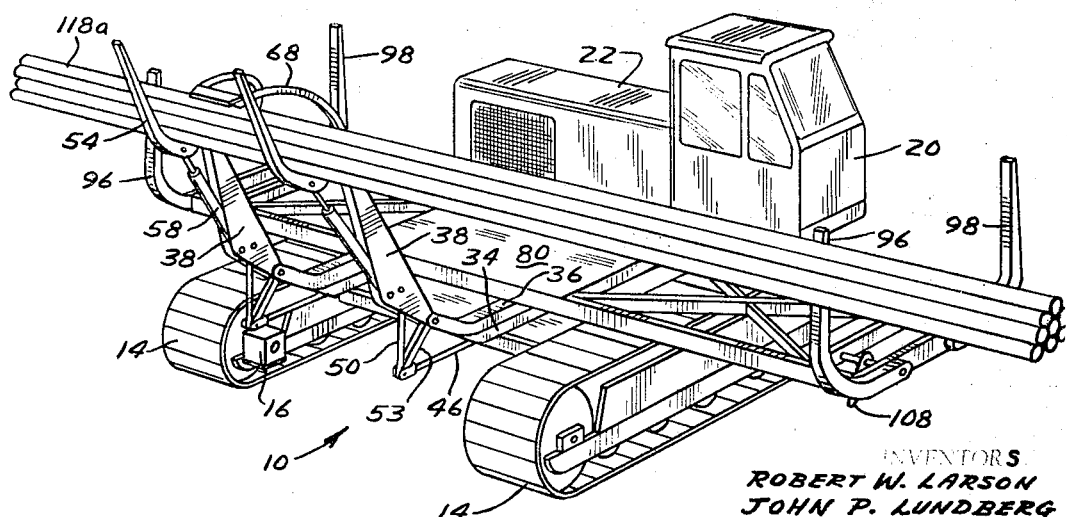

Referring now in detail to the drawings, the apparatus exemplifying the present invention comprises a vehicle 10 having a chassis 12 (best seen in FIGURES 6 and 7). A pair of endless tracks 14 renders the apparatus mobile, hydraulic motors 16 actuating the tracks so as to propel the vehicle 10.

A swing frame structure 18 is surmounted on the chassis 12. A swing house 20 is disposed on the frame structure 18 along with a combination engine and pump labeled 22. The swing frame structure 18 is intended to be swung through at least 90° by a chain 24 in mesh with a sprocket 26 on the underside of the frame structure 18, the chain being pulled in opposite directions by a pair of swing cylinders 28 and 29 having piston rods 30 and 31 associated therewith. If desired, a rotary hydraulic motor having a pinion engaged with a swing gear substituted for the sprocket 26 may be employed to obtain a 360° swing. It will be understood that the cylinders 28 and 29, as well as additional cylinders hereinafter referred to, receive hydraulic fluid under pressure from the engine-pump combination 22. For the sake of simplicity, the flexible tubes supplying the hydraulic fluid to the various cylinders have been omitted.

At this time, attention is called to a pair of side members 34 forming a part of the frame structure 18, these side members terminating in upwardly inclining end portions 36. A pair of channel-shaped lift arms 38 is pivotally attached to the upwardly inclining end portions 36 through the agency of pivot pins 39. Although other types of drive motors can be employed, the drawings are simplified by showing two-stage lift cylinders 40, there being one for each lift arm 38. These lift cylinders 40 are pivotally connected at their closed ends to the frame structure 18 via pivot pins 42 (see FIGURE 6). As the name implies, the two-stage lift cylinders 40 each have a first piston rod 44 and a second piston rod 46 telescopically received in the first piston rod 44. In this way, a considerable degree of piston rod extension can be achieved in a minimum amount of space. The free end of the piston rod 46 carries a clevis 48 and this clevis is connected to a link 50 in each instance by a pivot pin 52. A guide link 53 is connected at one end to the pivot pin 39 and to the pivot pin 52 at the other end. Once again, it will be manifest that the foregoing linkage is duplicated as far as each of the lift arms 38 is concerned.

A pair of curved fork members 54 is pivotally connected at 56 to the distal ends of the lift arms 38. In order to rock the curved fork members 54, cylinders 58 are employed, each being pivotally connected at 60 to the lift arms 38 and there is a piston rod 62 projecting from each cylinder 58 which connects to the curved fork members in each instance through the agency of a pivot pin 64.

In order to clamp the logs as they are picked up, a clamping jaw 66 is employed, being connected via diverging arms 68 and pins 70 to the free upper ends of the curved fork members 54. As best viewed in FIGURE 8, although appearing also in FIGURE 7, there is a spring 72 that biases the clamping jaw 66 into an open position; this open position is illustrated in phantom outline in FIGURE 7 and is shown in solid outline in FIGURE 1. To close the clamping jaw 66, a pair of cylinders 74 is utilized and the pistons 76 are attached to cables 78 which are, in turn, attached at their other ends to the diverging arms 78. Consequently, the biasing action of the spring 72 can be readily overcome when the jaw 66 is to be actuated into a closed relationship with the curved fork members 54.

Carried on the frame structure 18 is a tiltable platform designated generally by the reference numeral 80. The platform includes a pair of frame members 82 projecting from an underlying relationship so as to provide inclined end portions 84. The previously-mentioned pins 39 serve as pivot points for these end portions 84. In order to tilt the platform 80, a pair of two-stage cylinders 86 is resorted to. The closed ends of these cylinders 86 are pivotally connected to the frame structure 18 by pivot pins 88. A first piston rod 90 is extendable from the cylinder 86 in each instance and a second piston rod 92 is projectable from the first piston rod 90. The second piston rod 92 in each instance is connected by a pivot pin 94 to the underside of the platform 80.

A pair of upstanding curved holding posts 96 is located at what will be considered the forward side of the platform 80, and a similar pair of holding posts 98 is disposed at the rear side. The forward posts 96 are independently movable by reason of cylinders 104, each having a piston rod 106 which is connected to a rocker arm 108 by a pivot pin 110. Similarly, the rear holding posts 98 are connected by linkage comprised of the members 104a, 106a and 108a.

A sequence of arrows 112 (FIGURE 6) indicates the path taken by the curved fork members 54 when raised through the agency of the lift arms 38. The path traversed by the pin 52 which is responsible for causing the lift arms 38 to be raised has been denoted by the arrows 114. Similarly, a pair of arrows 116 signifies the path traversed by the clamping jaw 66.

In operation, assuming that a pile of logs 118a as shown in FIGURE 1 is to be raised, then the vehicle 10 is moved from the position shown in FIGURE 1 so that the fork members 54 underlie at least some of the logs contained in the pile 118a. It will be appreciated that the swing frame 18 and the patform 80 are at this time in a transverse position, being actuatable into such position by retracting the piston rod 30 associated with the swing cylinder 28.

As the vehicle 10 approaches the pile 118a, the fork members 54 will automatically go under the pile and when a sufficient number of tree-length logs has been scooped onto the fork members 54, then the clamping jaw 66 can be actuated downwardly by retraction of the piston rods 76 into their cylinders 74. This condition is illustrated in FIGURES 7 and 8.

The logs now resting on the fork members 54 are ready to be elevated, and this is done by introducing hydraulic fluid into the two-stage cylinders 40 so as to force outwardly the piston rods 44 and 46 associated therewith. Such action causes the lift arms 38 to be raised, moving in a clockwise direction as viewed in FIGURE 6 and which direction follows the arrows 112.

When the first group of logs has been elevated and these logs are directly over the platform 80, the clamping jaw 66 can be opened so that the logs will then be deposited on the platform 80. Such a stage of the loading procedure is depicted in FIGURE 3 and the solid position shown in FIGURE 6. Obviously, the holding posts 96 and 98 are upright at this time in order to cradle the tree-length logs as they are lowered. Although only a change of location has transpired, it will be recognized that the logs now on the platform 80 have been designated by the reference numeral 118b which distinguishes them from the logs 118a which constituted the pile of logs on the ground.

After a sufficient number of tree-length logs 118b has been placed on the platform in the foregoing manner, this being by raising and lowering the lift arms 38 and moving the vehicle forwardly and rearwardly each time, the frame structure 18 is swung from its transverse position to a longitudinal position, this being through an angle of 90°. To do this, the swing cylinder 29 is supplied with hydraulic fluid and its piston 31 is retracted so as to cause the chain 24 to rotate the sprocket 26 and hence the frame structure 18, as well as the platform 80. This 90° position is depicted in FIGURE 4. It is when the tree-length logs 118b are so oriented that the vehicle 10 can negotiate relatively narrow passes through wooded regions. Because of the substantial length of the logs, this cannot be achieved in actual practice with the logs in the position shown in FIGURE 3. Hence, decided advantages are obtained, both with respect to clearance of still standing trees in wooded regions and also as far as stability is concerned because the vehicle 10 will usually be longer than it is wide, the latter being important because of the overall length of these logs.

In some instances, the logs 118b are to be transported to a slasher where they will be cut into six to eight foot sticks, and in other instances, they will be merely hauled to a central point and either stored there or reloaded for further movement. At any rate, it will be clear that a substantial gain is obtained by using the same vehicle for loading and transporting the logs.

When the discharge location is reached, then the frame structure 18 and its surmounted platform 80 are swung back through 90° so as to have the platform reside in the same transverse position that it originally was in during the loading of the logs. The return to this position is shown in FIGURE 5 and it will be seen from FIGURE 5 and also FIGURE 7 that the arms 38 are again lowered so as to provide a declining ramp for the logs to roll down. Similarly, the curved fork members 54 are oriented so as to provide an intermediate continuation of the ramp provided by the arms 38. Still further, the clamping jaw 66 is moved into a closed position so that its diverging arms provide an additional continuation of the ramp down which the logs are to descend.

In preparation for unloading the logs, the foremost holding posts 96 are lowered by retracting the piston rods 106 into their respective cylinders 104. It will be recalled that the holding posts 96 and 98 are independently actuatable. Hence, when the logs are in transit, as viewed in FIGURE 4, the holding posts 96 and 98 can securely grip the logs 118b. However, when the platform 80 is tilted into the position depicted in FIGURES 5 and 7, the logs gravitationally roll off the platform and continue down the ramp that has previously been mentioned. The logs as they appear when deposited on the ground once again have been given the reference numeral 118c.

Consequently, it will be appreciated that the operator of the vehicle 10 can be kept constantly busy, for he conducts the loading operation, the hauling operation, and the discharge operation. The apparatus herein described eliminates the need for special loading equipment and the need for separate and distinct trucks or tractors. Also, where skidders are utilized, the present invention can obviate the need for such skidders, although a skidder can be employed to get the logs into the pile previously designated by the reference numeral 118a and which pile is illustrated in FIGURE 1. However, it is contemplated that the previously-alluded-to apparatus for delimbing and felling trees will place the tree-length logs in a pile that can then be loaded onto the platform 80 as hereinbefore described.

We claim:

1. Apparatus for loading and transporting tree-length logs comprising a self-propelled vehicle, a frame structure pivotally carried on said vehicle for horizontal swinging movement between first and second positions, an elongated platform mounted on said frame structure for swinging movement in unison with said frame structure, said platform having a length greater than the width of said vehicle and having its longitudinal axis generally transverse to the direction in which said vehicle travels when said frame structure is in said first position and having its longitudinal axis generally parallel to the direction in which said vehicle travels when said frame structure is in said second position, arm means pivotally connected about a horizontal axis at one end thereof to said frame structure and projectable away from one side of said platform in a direction generally parallel to the direction in which said vehicle travels when said frame structure is in its said first position, and fork means carried at the other end of said arm means and insertable under a pile of tree-length logs for elevating such logs from the ground onto said platform when said frame structure is in said first position, whereby said vehicle can be advanced toward such pile of logs on the ground with said frame structure in said first position to crowd said fork means under the logs to facilitate the loading of the logs on said fork means and whereby said vehicle can thereafter transport logs placed on said platform with said frame structure in said second position.

2. Apparatus in accordance with claim 1 in which said fork means is pivotally attached to said other end of said arm means so as to be movable into a clamping relationship with said pile of logs and into a discharge relationship in order to allow said logs to be deposited upon said platform.

3. Apparatus in accordance with claim 2 including a pair of upwardly directed, spaced posts at each side of said platform for holding said logs on the platform after they have been deposited thereon.

4. Apparatus in accordance with claim 1 including means adjacent each end of said platform for holding said logs on the platform after they have been deposited thereon.

5. Apparatus in accordance with claim 1 including a swing house disposed on the frame structure adjacent the side of said platform opposite said one side, whereby said swing house does not interfere with the depositing of logs onto said platform.

6. Apparatus for loading and transporting tree-length logs comprising a vehicle, a frame structure pivotally carried on said vehicle for swinging movement between a first position generally transverse to the direction in which said vehicle travels and a second position generally parallel to the direction in which said vehicle travels, a platform mounted on said frame structure for swinging movement in unison with said frame structure, elevating means located adjacent one side of said frame structure including a pair of pivotal arms movable from a downwardly inclined position to an upwardly directed position, a pair of fork members pivotally attached to the distal ends of said arms and insertable under a pile of tree-length logs on the ground to facilitate the loading of said logs on said platform when said frame structure and platform are in said first position, said fork members being movable into a clamping relationship with said pile of logs, and a pair of upwardly directed, spaced posts at each side of said platform for holding said logs on the platform after they have been deposited thereon, said posts being pivotally mounted for convergent and divergent movement with respect to each other so that said posts can clamp logs placed on said platform and can release logs placed thereon whereby said vehicle can transport said logs with said frame structure and platform in said second position.

7. Apparatus in accordance with claim 6 in which said platform is tiltably mounted on said frame structure so as to be tilted into a sloping position in order to discharge said logs.

8. Apparatus in accordance with claim 7 in which said arms for elevating the logs and the posts at one side of said platform are movable into a downwardly declining position with respect to said platform so that when said platform is tilted there will be formed a ramp over which said logs may roll onto the ground after being transported to their destination.

References Cited

UNITED STATES PATENTS

| | | | |
|---|---|---|---|
| 1,525,451 | 2/1925 | Kurtz | 214—38 |
| 1,541,457 | 6/1925 | Winn | 214—38 |
| 2,072,495 | 3/1937 | Browner | 214—90 |
| 2,656,057 | 10/1953 | Felderman et al. | 214—75 |
| 2,704,160 | 3/1955 | Arvidsson | 214—77 |
| 2,786,590 | 3/1957 | Edwards et al. | 214—38 X |
| 3,125,234 | 3/1964 | Gustine | 214—147 X |
| 3,165,217 | 1/1965 | Harris et al. | 214—670 |
| 3,227,295 | 1/1966 | Hamilton et al. | 214—77 |
| 3,231,109 | 1/1966 | Bengel et al. | 214—670 |

FOREIGN PATENTS

| | | |
|---|---|---|
| 659,445 | 3/1963 | Canada. |
| 689,502 | 6/1964 | Canada. |
| 656,593 | 2/1964 | Germany. |

GERALD M. FORLENZA, *Primary Examiner.*

ROBERT J. SPAR, *Assistant Examiner.*

U.S. Cl. X.R.

214—147, 505